(12) United States Patent
Ito

(10) Patent No.: US 11,429,717 B2
(45) Date of Patent: Aug. 30, 2022

(54) SIGNATURE GENERATING DEVICE, SIGNATURE GENERATING METHOD, AND NON-TRANSITORY COMPUTER-READABLE MEDIUM STORING PROGRAM

(71) Applicant: NEC CORPORATION, Tokyo (JP)

(72) Inventor: Tatsuya Ito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 364 days.

(21) Appl. No.: 16/497,124

(22) PCT Filed: Dec. 20, 2017

(86) PCT No.: PCT/JP2017/045830
§ 371 (c)(1),
(2) Date: Sep. 24, 2019

(87) PCT Pub. No.: WO2018/179628
PCT Pub. Date: Oct. 4, 2018

(65) Prior Publication Data
US 2020/0380128 A1 Dec. 3, 2020

(30) Foreign Application Priority Data
Mar. 28, 2017 (JP) .............................. JP2017-062918

(51) Int. Cl.
*G06F 21/00* (2013.01)
*G06F 21/56* (2013.01)
(Continued)

(52) U.S. Cl.
CPC ...... *G06F 21/564* (2013.01); *G06F 16/90344* (2019.01); *G06F 21/577* (2013.01)

(58) Field of Classification Search
CPC . G06F 21/577; G06F 16/90344; G06F 21/564
(Continued)

(56) References Cited

U.S. PATENT DOCUMENTS 10,225,269 B2 *  3/2019  Yi ........................ H04L 63/1416
2005/0265331 A1 * 12/2005 Stolfo ...................... G06F 21/55
                                                            370/389

(Continued)

FOREIGN PATENT DOCUMENTS

JP    2005-520230 A    7/2005
JP    2006-350708 A   12/2006
(Continued)

OTHER PUBLICATIONS

Communication dated Mar. 26, 2020, from the Russian Patent and Trademark Office in application No. 2019130058/08(059236).
(Continued)

*Primary Examiner* — Josnel Jeudy
(74) *Attorney, Agent, or Firm* — Sughrue Mion, PLLC

(57) ABSTRACT

A signature generating device (2) includes a collecting unit (11) configured to collect threat information, an extracting unit (21) configured to extract attack data from the threat information collected by the collecting unit (11), and a generating unit (31) configured to generate a signature on the basis of the attack data extracted by the extracting unit (21). When plural pieces of attack data having a common character string are extracted by the extracting unit (21), the generating unit (31) tentatively generates a signature including the common character string, evaluates whether a tentatively generated signature includes a character string used in non-attack data, and when the tentatively generated signature includes the character string used in the non-attack data, removes the character string from the tentatively generated signature to generate a signature.

9 Claims, 5 Drawing Sheets

(51) Int. Cl.
*G06F 16/903* (2019.01)
*G06F 21/57* (2013.01)

(58) Field of Classification Search
USPC .......................................................... 726/24
See application file for complete search history.

(56) References Cited

U.S. PATENT DOCUMENTS

| | | |
|---|---|---|
| 2006/0075504 A1 | 4/2006 | Liu |
| 2007/0038677 A1 | 2/2007 | Reasor et al. |
| 2007/0180528 A1 | 8/2007 | Kane |
| 2008/0127336 A1 | 5/2008 | Sun et al. |
| 2014/0007238 A1 | 1/2014 | Magee et al. |
| 2016/0180088 A1* | 6/2016 | Zhang ................ H04L 63/1416 726/23 |
| 2017/0264626 A1* | 9/2017 | Xu ........................ H04L 63/145 |
| 2019/0141061 A1* | 5/2019 | Krishtal ................ H04L 63/101 |
| 2020/0293656 A1* | 9/2020 | Lakhotia ............. G06F 11/3604 |

FOREIGN PATENT DOCUMENTS

| | | |
|---|---|---|
| JP | 2012-3463 A | 1/2012 |
| JP | 2012-529690 A | 11/2012 |
| RU | 2573262 C2 | 1/2016 |
| WO | 03/058457 A1 | 7/2003 |

OTHER PUBLICATIONS

Communication dated Jun. 23, 2020, from the Japanese Patent Office in Application No. 2019-508574.
Sumeet Singh et al., "Automated Worm Fingerprinting", OSDI 04, Dec. 2004, 20 pages.
International Search Report for PCT/JP2017/045830 dated Mar. 20, 2018 [PCT/ISA/210].

* cited by examiner

| Type | rule | tag | URL (Source) |
|---|---|---|---|
| IP Address | parser1 | tor | https://www.binarydefense.com/tor.txt |
| File | parser2,sha256sum, yara_rule1 | Malware,DarkComet | http://vxvault.net |

| Source | Type | Object | date | tag |
|---|---|---|---|---|
| Akamai | IP Address | 203.0.113.100 | 2017/1/27 | tor |
| VirusTotal | File | 13258ed7feea07d219d9ac7d4afd02b5 | 2017/1/31 | Malware,DarkComet |

Fig. 3

SIGNATURE GENERATING DEVICE, SIGNATURE GENERATING METHOD, AND NON-TRANSITORY COMPUTER-READABLE MEDIUM STORING PROGRAM

CROSS REFERENCE TO RELATED APPLICATIONS

This application is a National Stage of International Application No. PCT/JP2017/045830 filed Dec. 20, 2017, claiming priority based on Japanese Patent Application No. 2017-062918 filed on Mar. 28, 2017, the disclosure of which is incorporated herein in its entirety by reference.

TECHNICAL FIELD

The present disclosure relates to signature generating devices, signature generating methods, and programs.

BACKGROUND ART

Computers are susceptible to attacks by attack data, such as malware, from the outside. Malware is malicious software created with an intention of causing a computer to operate illicitly and harmfully, and examples include computer viruses and worms.

One approach to detecting such attack data is what is called a signature-based system. In the signature-based system, a signature defining attack data is registered, and whether data from the outside is attack data is determined by the use of the signature.

There are countless pieces of existing attack data, and new attack data appear one after another. Therefore, signatures also need to be created and updated continuously. However, it is difficult for a single person or organization to keep track of all the countless pieces of existing attack data and to keep generating signatures.

Accordingly, techniques for collecting threat information and automatically generating a signature on the basis of the collected threat information have recently been proposed (for example, Patent Literatures 1 and 2).

CITATION LIST

Patent Literature

Patent Literature 1: Published Japanese Translation of PCT International Publication for Patent Application, No. 2005-520230

Patent Literature 2: International Patent Publication No. WO2003/058457

SUMMARY OF INVENTION

Technical Problem

According to the techniques disclosed in Patent Literatures 1 and 2, the signature generated on the basis of the threat information is not verified in particular. Therefore, the techniques suffer from shortcomings in that the signature may erroneously identify non-attack data as attack data.

In view of the above shortcomings, the present disclosure is directed to providing a signature generating device, a signature generating method, and a program that are capable of generating such a signature that reduces the possibility of misidentifying non-attack data as attack data.

Solution to Problem

In one aspect, a signature generating device includes
a collecting unit configured to collect threat information;
an extracting unit configured to extract attack data from the threat information collected by the collecting unit; and
a generating unit configured to generate a signature on the basis of the attack data extracted by the extracting unit, wherein
the generating unit is configured to,
when plural pieces of attack data having a common character string are extracted by the extracting unit, tentatively generate a signature including the common character string,
evaluate whether a tentatively generated signature includes a character string used in non-attack data, and
when the tentatively generated signature includes the character string used in the non-attack data, remove the character string from the tentatively generated signature to generate a signature.

In one aspect, a signature generating method is a method of generating a signature with a signature generating device, and the method includes
a collecting step of collecting threat information;
an extracting step of extracting attack data from the threat information collected in the collecting step; and
a generating step of generating a signature on the basis of the attack data extracted in the extracting step, wherein
the generating step includes,
when plural pieces of attack data having a common character string are extracted in the extracting step, tentatively generating a signature including the common character string,
evaluating whether a tentatively generated signature includes a character string used in non-attack data, and
when the tentatively generated signature includes the character string used in the non-attack data, removing the character string from the tentatively generated signature to generate a signature.

In one aspect, a program causes a computer to execute:
a collecting procedure of collecting threat information;
an extracting procedure of extracting attack data from the threat information collected in the collecting procedure; and
a generating procedure of generating a signature on the basis of the attack data extracted in the extracting procedure, wherein
the generating procedure includes,
when plural pieces of attack data having a common character string are extracted in the extracting procedure, tentatively generating a signature including the common character string,
evaluating whether a tentatively generated signature includes a character string used in non-attack data, and
when the tentatively generated signature includes the character string used in the non-attack data, removing the character string from the tentatively generated signature to generate a signature.

Advantageous Effects of Invention

The above aspects make it possible to obtain an advantageous effect of being able to generate such a signature that reduces the possibility of misidentifying non-attack data as attack data.

BRIEF DESCRIPTION OF THE DRAWINGS

FIG. 3 illustrates an example of a data format of attack data held in an extracting unit illustrated in FIG. 1.

DESCRIPTION OF EMBODIMENTS

Hereinafter, example embodiments of the present disclosure will be described with reference to the drawings.

Figures 1, 2:
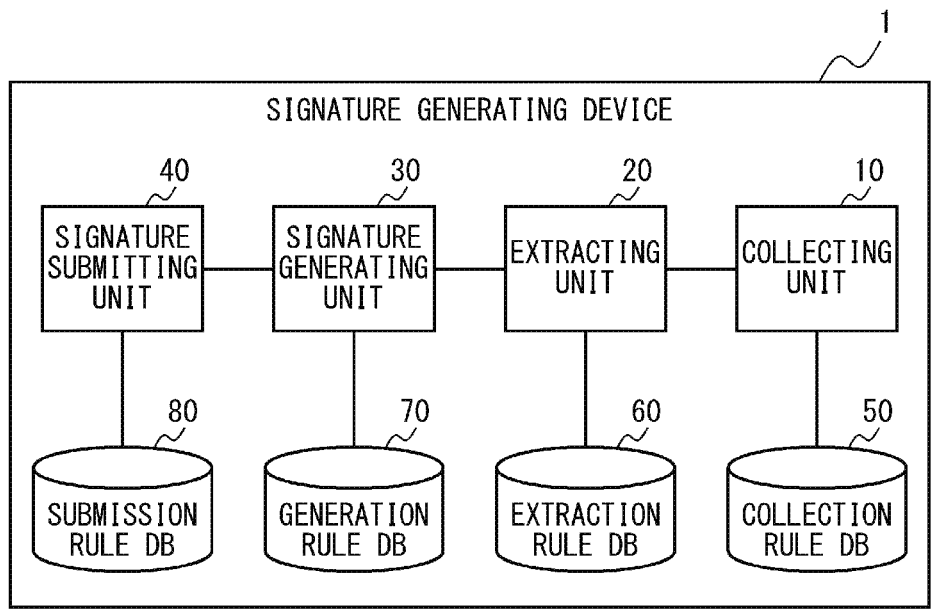
FIG. 1 illustrates an example of a configuration of a signature generating device according to an example embodiment of the present disclosure.
FIG. 2 illustrates an example of an extraction rule registered in an extraction rule DB illustrated in FIG. 1.

First, with reference to FIG. 1, a configuration of a signature generating device 1 according to the present example embodiment will be described. FIG. 1 illustrates an example of a configuration of the signature generating device 1 according to the present example embodiment. The signature generating device 1 includes a collecting unit 10, an extracting unit 20, a signature generating unit 30, a signature submitting unit 40, a collection rule database (DB) 50, an extraction rule DB 60, a generation rule DB 70, and a submission rule DB 80. The collection rule DB 50, the extraction rule DB 60, the generation rule DB 70, and the submission rule DB 80 are not limited to being provided inside the signature generating device 1 and may be provided outside the signature generating device 1.

The collecting unit 10 collects threat information in accordance with a collection rule registered in the collection rule DB 50. Threat information indicates threats to computers and is provided by a number of threat information providers. The collection rule defines, for example, the uniform resource locator (URL) of a source of threat information (e.g., threat information provider's server), the type of the threat information collected from that source (e.g., threat information on internet protocol (IP) address), and so on. The collecting unit 10, for example, collects the threat information of the type defined by the collection rule from the source under the URL defined by the collection rule.

The extracting unit 20 extracts attack data from the threat information collected by the collecting unit 10 in accordance with an extraction rule registered in the extraction rule DB 60. The operation of the extracting unit 20 will be described later in detail.

The signature generating unit 30 generates a signature on the basis of the attack data extracted by the extracting unit 20 and in accordance with a generation rule registered in the generation rule DB 70. The operation of the signature generating unit 30 will be described later in detail.

The signature submitting unit 40 submits the signature generated by the signature generating unit 30 to a submission destination in accordance with a submission rule registered in the submission rule DB 80. The submission destination of the signature is a device that detects attack data coming to a computer from the outside and is, for example, a security server disposed on a network, a security module disposed in a client terminal, or the like. The submission rule defines, for example, the submission destination to which the signature is submitted, a method of accessing that submission destination (e.g., identification (ID) and/or password), and so on. The signature submitting unit 40, for example, accesses the submission destination defined by the submission rule through the accessing method defined by the submission rule to submit the signature.

Now, with reference to FIGS. 2 and 3, an operation of the extracting unit 20 according to the present example embodiment will be described. FIG. 2 illustrates an example of the extraction rule registered in the extraction rule DB 60. The extraction rule illustrated in FIG. 2 defines the type of threat information ("Type" in FIG. 2), a rule for extracting attack data from the threat information ("rule" in FIG. 2), a tag set in the extracted attack data ("tag" in FIG. 2), and the URL of the source of the threat information ("URL (Source)" in FIG. 2).

The extracting unit 20 extracts attack data from the threat information that has been collected by the collecting unit 10 from the source under the URL defined by the extraction rule and that is of the type defined by the extraction rule in accordance with the rule defined by the extraction rule. The extracting unit 20 then sets the tag defined by the extraction rule into the extracted attack data.

To be more specific, the extracting unit 20 extracts attack data in accordance with the rule "parser1" with regard to the threat information that has been collected from the source under the URL "https://www.binarydefense.com/tor.txt" and that is of the type "IP address." The extracting unit 20 then sets the tag "tor" in the extracted attack data.

The extracting unit 20 holds the attack data extracted above, and the signature generating unit 30 generates a signature on the basis of the attack data held in the extracting unit 20.

Here, threat information has a different data format depending on where the threat information has been collected from. If the extracting unit 20 holds each piece of attack data in a different data format, when the signature generating unit 30 retrieves a given piece of attack data held in the extracting unit 20, the signature generating unit 30 needs to recognize the data format of that attack data, which increases the time required for generating a signature.

Therefore, the extracting unit 20 holds the attack data extracted above upon converting its data format into a predetermined data format. FIG. 3 illustrates an example of the data format of the attack data held in the extracting unit 20. The headers of the data format illustrated in FIG. 3 are the source of the threat information from which the attack data has been extracted ("Source" in FIG. 3), the type of that threat information ("Type" in FIG. 3), the object representing that attack data ("Object" in FIG. 3), the date on which that attack data has been extracted ("date" in FIG. 3), and the tag set in that attack data ("tag" in FIG. 3). The object representing the attack data may be the attack data itself or a hash value of that attack data. The method of calculating the hash value can be defined by a rule, for example, in the extraction rule illustrated in FIG. 2.

In this manner, since the extracting unit 20 holds the attack data upon converting its data format into a predetermined data format, the signature generating unit 30 can promptly retrieve the attack data from the extracting unit 20, and this makes it possible to reduce the time required for generating a signature.

Figure 4:
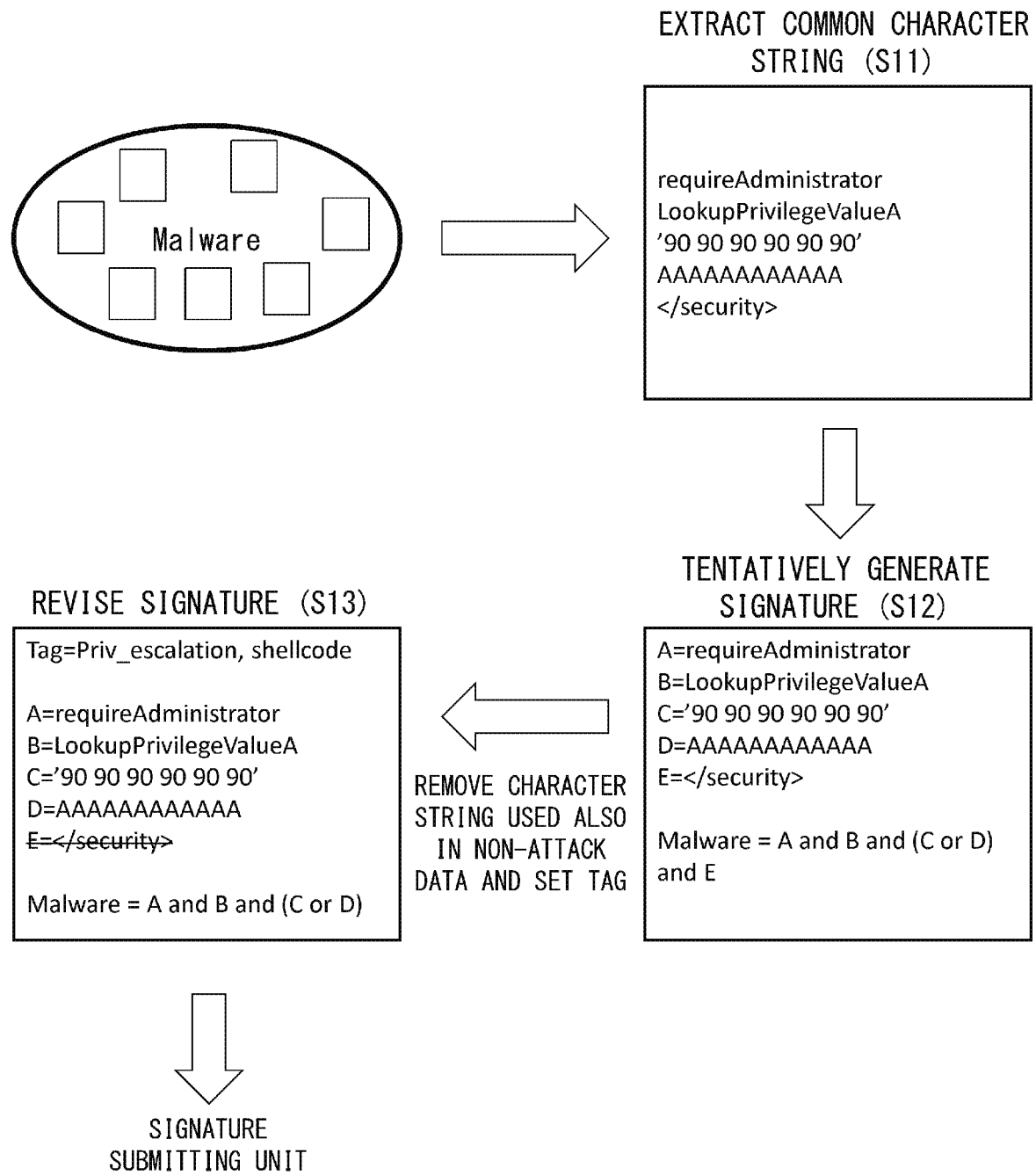
FIG. 4 illustrates an example of an operation of a signature generating unit illustrated in FIG. 1.

Now, with reference to FIG. 4, an operation of the signature generating unit 30 according to the present example embodiment will be described. FIG. 4 illustrates an example of an operation of the signature generating unit 30. Herein, an example in which the attack data is malware will be described.

The generate rule registered in the generation rule DB 70 defines that, when plural pieces of attack data having a common character string are extracted by the extracting unit 20, a signature including the common character string is generated. Therefore, when plural pieces of attack data having a common character string are extracted by the extracting unit 20, the signature generating unit 30 extracts the common character string (step S11) and tentatively generates a signature including the common character string (step S12).

In the example illustrated in FIG. 4, the signature generating unit 30 extracts five character strings A, B, C, D, and E each as a common character string in step S11 and tentatively generates a signature defining malware with a function "A and B and (C or D) and E" in step S12.

In the generation rule DB 70, aside from the generation rule, a white list is registered, and the white list is a list of character strings that are used also in non-attack data that is not attack data. Furthermore, the generation rule defines that matching is performed between a character string included in a tentatively generated signature and a character string in the white list. Therefore, the signature generating unit 30 performs matching between a character string included in the tentatively generated signature and a character string in the white list and thus evaluates whether the tentatively generated signature includes a character string used in non-attack data. When the tentatively generated signature includes a character string used in non-attack data, the signature generating unit 30 removes that character string from the tentatively generated signature to revise the tentatively generated signature (step S13). Thus, a signature is generated.

In the example illustrated in FIG. 4, the signature generating unit 30 performs matching between the five character strings A, B, C, D, and E included in the tentatively generated signature and the character strings in the white list, which results in an evaluation that the tentatively generated signature includes the character string E (=</ security>) used in non-attack data. Therefore, in step S13, the signature generating unit 30 removes the character string E from the tentatively generated signature and changes the function defining the malware to "A and B and (C or D)" to revise the signature. In addition, a tag is set in the revised signature. Thus, the signature is generated.

In this manner, the signature generating unit 30 tentatively generates a signature that includes a common character string included in plural pieces of attack data, and when the tentatively generated signature includes a character string used in non-attack data, the signature generating unit 30 removes that character string from the tentatively generated signature to generate a signature. This makes it possible to reduce the possibility that the signature misidentifies non-attack data as attack data.

Figure 5:
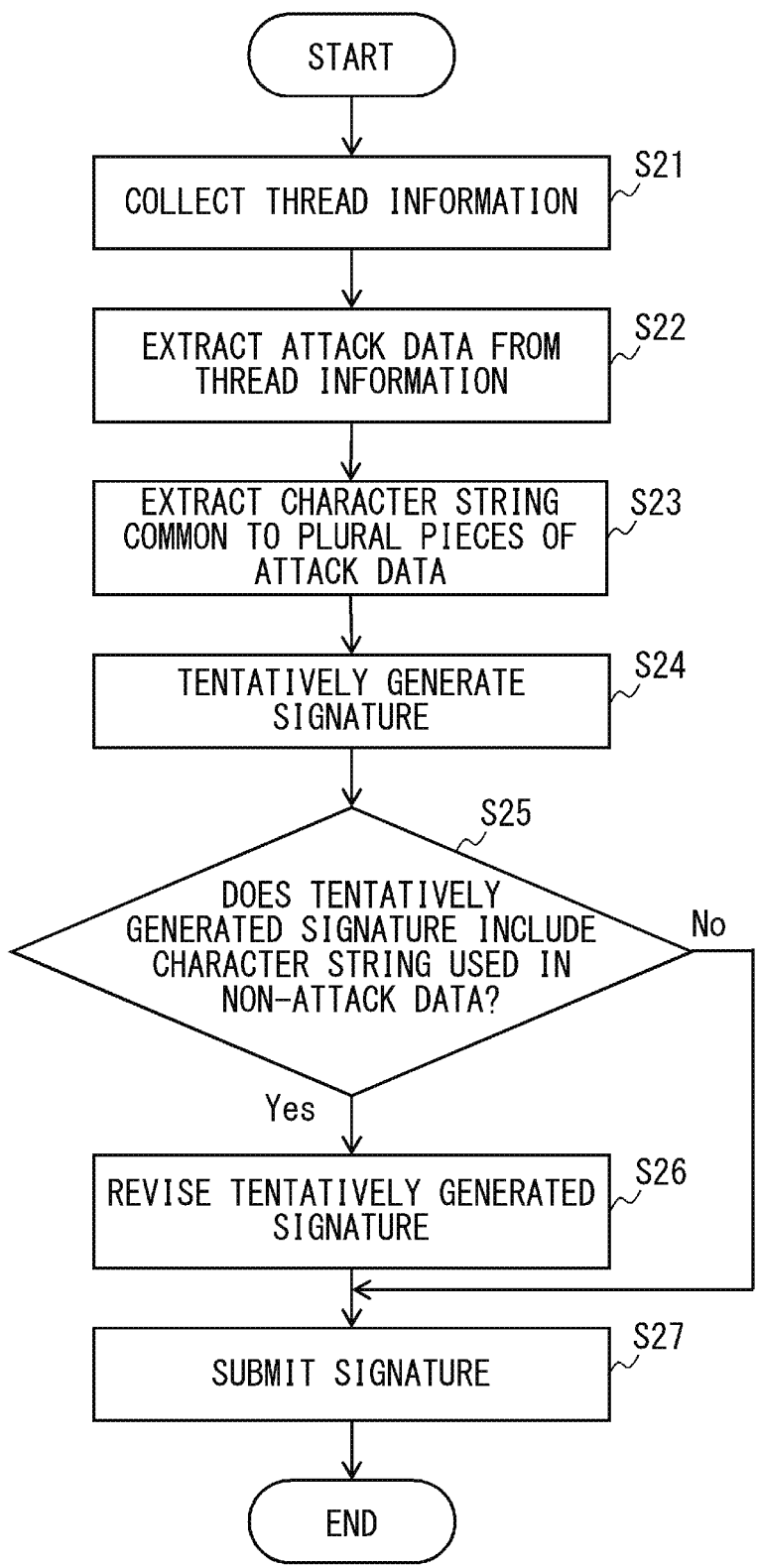
FIG. 5 is a flowchart illustrating an example of a processing flow of the signature generating device illustrated in FIG. 1.

Now, with reference to FIG. 5, a processing flow of the signature generating device 1 according to the present example embodiment will be described. FIG. 5 is a flowchart illustrating an example of a processing flow of the signature generating device 1 according to the present example embodiment.

First, the collecting unit 10 collects threat information in accordance with the collection rule registered in the collection rule DB 50 (step S21). Then, the extracting unit 20 extracts attack data from the threat information collected by the collecting unit 10 in accordance with the extraction rule registered in the extraction rule DB 60 (step S22).

The signature generating unit 30 then generates a signature as follows in accordance with the generation rule registered in the generation rule DB 70.

The signature generating unit 30 stands by until plural pieces of attack data having a common character string are extracted by the extracting unit 20. When plural pieces of attack data having a common character string are extracted by the extracting unit 20, the signature generating unit 30 extracts that common character string (step S23) and tentatively generates a signature including the extracted common character string (step S24).

Then, the signature generating unit 30 performs matching between a character string included in the tentatively generated signature and a character string in the white list and thus evaluates whether the tentatively generated signature includes a character string used in non-attack data (step S25).

If, in step S25, the tentatively generated signature includes a character string used in non-attack data (Yes in step S25), the signature generating unit 30 removes this character string from the tentatively generated signature to revise the tentatively generated signature (step S26). In this case, the signature generating unit 30 adopts the revised signature as a newly generated signature.

Meanwhile, if, in step S25, the tentatively generated signature does not include any character string used in non-attack data (No in step S25), the tentatively generated signature is adopted as a newly generated signature without any revision made thereto.

Thereafter, the signature submitting unit 40 submits the signature generated by the signature generating unit 30 to a submission destination in accordance with the submission rule registered in the submission rule DB 80 (step S27).

As described above, with the signature generating device 1 according to the present example embodiment, the signature generating unit 30 tentatively generates a signature that includes a common character string included in plural pieces of attack data, and when the tentatively generated signature includes a character string used in non-attack data, the signature generating unit 30 removes that character string from the tentatively generated signature to generate a signature. This makes it possible to reduce the possibility that the signature misidentifies non-attack data as attack data.

Figure 6:
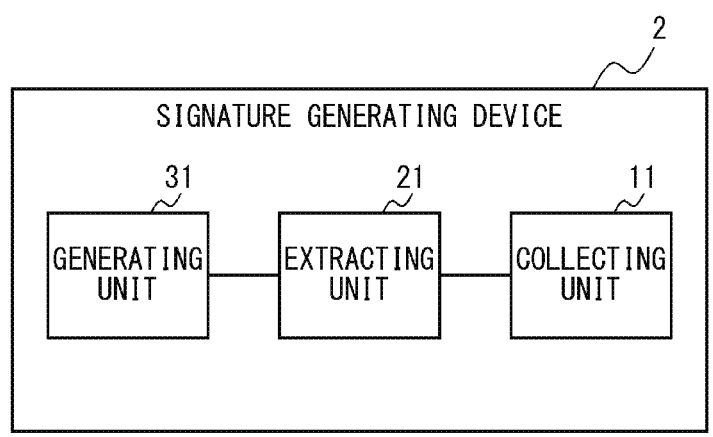
FIG. 6 illustrates an example of a configuration of a signature generating device according to the present disclosure.

Hereinafter, with reference to FIG. 6, an overview of a signature generating device according to the present disclosure will be described. FIG. 6 illustrates an example of a configuration of a signature generating device 2 according to the present disclosure. The signature generating device 2 includes a collecting unit 11, an extracting unit 21, and a generating unit 31.

The collecting unit 11 collects threat information. The collecting unit 11 corresponds to the collecting unit 10.

The extracting unit 21 extracts attack data from the threat information collected by the collecting unit 11. The extracting unit 21 corresponds to the extracting unit 20.

The generating unit 31 generates a signature on the basis of the attack data extracted by the extracting unit 21. Specifically, when plural pieces of attack data having a common character string are extracted by the extracting unit 21, the generating unit 31 tentatively generates a signature including that common character string. Then, the generating unit 31 evaluates whether the tentatively generated signature includes a character string used in non-attack data. If the tentatively generated signature includes a character string used in non-attack data, the generating unit 31 removes that character string from the tentatively generated signature to generate a signature. The generating unit 31 corresponds to the signature generating unit 30.

As described above, with the signature generating device 2 according to the present disclosure, the generating unit 31 tentatively generates a signature that includes a common character string included in plural pieces of attack data, and when the tentatively generated signature includes a character string used in non-attack data, the generating unit 31 removes that character string from the tentatively generated signature to generate a signature. This makes it possible to reduce the possibility that the signature misidentifies non-attack data as attack data.

Thus far, various aspects of the disclosure of the present application have been described with reference to the example embodiments, but the disclosure of the present application is not limited by the foregoing. Various modifications that a person skilled in the art can appreciate can be made to the configurations and the details of each aspect of the disclosure of the present application within the scope of the disclosure.

For example, the functional blocks (collecting unit, extracting unit, signature generating unit (or generating unit) and signature submitting unit) are provided within the same device in the foregoing example embodiment, but this is not a limiting example. These functional blocks may be provided in separate devices and interconnected via a cable or wirelessly.

Each functional block in the foregoing example embodiments may be constituted by hardware or software or both, and each functional block may be constituted by a single piece of hardware, a single piece of software, plural pieces of hardware, or plural pieces of software. The function (process) of each device may be implemented by a computer having a central processing unit (CPU), a memory, and so on. For example, a program for implementing a signature generating method according to an example embodiment may be stored in a memory, and this program stored in the memory may be executed by the CPU to implement each function.

The above-described program can be stored with the use of various types of non-transitory computer-readable media and supplied to a computer. The non-transitory computer-readable media include various types of tangible storage media. Examples of the non-transitory computer-readable media include a magnetic storage medium (e.g., flexible disk, magnetic tape, hard disk drive), an optical magnetic storage medium (e.g., magneto-optical disk), a compact disc read-only memory (CD-ROM), a compact disc recordable (CD-R), a compact disc rewritable (CD-R/W), and a semi-conductor memory (e.g., mask ROM, programmable ROM (PROM), erasable PROM (EPROM), flash ROM, random-access memory (RAM)). In addition, the program may be supplied to a computer in the form of various types of transitory computer-readable media. Examples of the transitory computer-readable media include an electric signal, an optical signal, and an electromagnetic wave. The transitory computer-readable media can supply the program to a computer via a wired communication line, such as an electric wire or an optical fiber, or via a wireless communication line.

A part or whole of the foregoing example embodiments can also be expressed as in the following supplementary notes but is not limited to the following.

Supplementary Note 1

A signature generating device comprising:
a collecting unit configured to collect threat information;
an extracting unit configured to extract attack data from the threat information collected by the collecting unit; and
a generating unit configured to generate a signature on the basis of the attack data extracted by the extracting unit, wherein
the generating unit is configured to,
when plural pieces of attack data having a common character string are extracted by the extracting unit, tentatively generate a signature including the common character string,
evaluate whether a tentatively generated signature includes a character string used in non-attack data, and
when the tentatively generated signature includes the character string used in the non-attack data, remove the character string from the tentatively generated signature to generate a signature.

Supplementary Note 2

The signature generating device according to Supplementary Note 1, wherein
the character string used in the non-attack data is stored in a database, and
the generating unit is configured to perform matching between a character string included in the tentatively generated signature and the character string stored in the database to evaluate whether the tentatively generated signature includes the character string used in the non-attack data.

Supplementary Note 3

The signature generating device according to Supplementary Note 1 or 2, wherein the extracting unit is configured to hold the attack data upon converting a data format thereof to a predetermined data format.

Supplementary Note 4

The signature generating device according to any one of Supplementary Notes 1 to 3, further comprising:
a submitting unit configured to submit the signature generated by the generating unit to a specific submission destination.

Supplementary Note 5

A method of generating a signature with a signature generating device, the method comprising:
a collecting step of collecting threat information;
an extracting step of extracting attack data from the threat information collected in the collecting step; and
a generating step of generating a signature on the basis of the attack data extracted in the extracting step, wherein
the generating step includes,
when plural pieces of attack data having a common character string are extracted in the extracting step, tentatively generating a signature including the common character string,
evaluating whether a tentatively generated signature includes a character string used in non-attack data, and
when the tentatively generated signature includes the character string used in the non-attack data, removing the character string from the tentatively generated signature to generate a signature.

Supplementary Note 6

The method of generating a signature according to Supplementary Note 5, wherein
the character string used in the non-attack data is stored in a database, and the generating step includes performing matching between a character string included in the tentatively generated signature and the character string stored in the database to evaluate whether the tentatively generated signature includes the character string used in the non-attack data.

Supplementary Note 7

The method of generating a signature according to Supplementary Note 5 or 6, wherein the extracting step includes holding the attack data upon converting a data format thereof to a predetermined data format.

Supplementary Note 8

The method of generating a signature according to any one of Supplementary Notes 5 to 7, further comprising:
a submitting step of submitting the signature generated in the generating step to a specific submission destination.

Supplementary Note 9

A program that causes a computer to execute:
a collecting procedure of collecting threat information;
an extracting procedure of extracting attack data from the threat information collected in the collecting procedure; and
a generating procedure of generating a signature on the basis of the attack data extracted in the extracting procedure, wherein
the generating procedure includes,
when plural pieces of attack data having a common character string are extracted in the extracting procedure, tentatively generating a signature including the common character string,
evaluating whether a tentatively generated signature includes a character string used in non-attack data, and
when the tentatively generated signature includes the character string used in the non-attack data, removing the character string from the tentatively generated signature to generate a signature.

Supplementary Note 10

The program according to Supplementary Note 9, wherein
the character string used in the non-attack data is stored in a database, and
the generating procedure includes performing matching between a character string included in the tentatively generated signature and the character string stored in the database to evaluate whether the tentatively generated signature includes the character string used in the non-attack data.

Supplementary Note 11

The program according to Supplementary Note 9 or 10, wherein the generating procedure includes holding the attack data upon converting a data format thereof to a predetermined data format.

Supplementary Note 12

The program according to any one of Supplementary Notes 9 to 11, further comprising:
a submitting procedure of submitting the signature generated in the generating procedure to a specific submission destination.

REFERENCE SIGNS LIST

1 SIGNATURE GENERATING DEVICE
10 COLLECTING UNIT
20 EXTRACTING UNIT
30 SIGNATURE GENERATING UNIT
40 SIGNATURE SUBMITTING UNIT
50 COLLECTION RULE DB
60 EXTRACTION RULE DB
70 GENERATION RULE DB
80 SUBMISSION RULE DB
2 SIGNATURE GENERATING DEVICE
11 COLLECTING UNIT
21 EXTRACTING UNIT
31 GENERATING UNIT

The invention claimed is:
1. A signature generating device comprising:
one or more hardware processors configured to implement:
a collecting unit configured to collect threat information;
an extracting unit configured to extract attack data from the threat information collected by the collecting unit; and
a generating unit configured to generate a second signature on the basis of the attack data extracted by the extracting unit, wherein
the generating unit is configured to:
when plural pieces of attack data having a common character string are extracted by the extracting unit, generate a candidate signature including the common character string,
evaluate, using a white list, whether the candidate signature includes a character string used in non-attack data, wherein the white list is a list of character strings that are used also in the non-attack data that is not the attack data,
when the candidate signature includes the character string from the white list used in the non-attack data, remove the character string from the candidate signature to obtain the second signature, and
when the candidate signature does not include the character string used in the non-attack data, obtain the second signature as the candidate signature.
2. The signature generating device according to claim 1, wherein
the character string used in the non-attack data is stored in a database, and
the generating unit is configured to perform matching between a character string included in the candidate signature and the character string stored in the database to evaluate whether the candidate signature includes the character string used in the non-attack data.
3. The signature generating device according to claim 1, wherein the extracting unit is configured to hold the attack data upon converting a data format thereof to a predetermined data format.
4. The signature generating device according to claim 1, further comprising:
a submitting unit configured to submit the second signature to a specific submission destination.
5. A method of generating a signature with a signature generating device, the method comprising:
collecting threat information;
extracting attack data from the threat information collected in the collecting; and generating a second signature on the basis of the attack data extracted in the extracting, wherein
the generating includes:
- when plural pieces of attack data having a common character string are extracted in the extracting, generating a candidate signature including the common character string,
- evaluating, using a white list, whether the candidate signature includes a character string used in non-attack data, wherein the white list is a list of character strings that are used also in the non-attack data that is not the attack data,
- when the candidate signature includes the character string from the white list used in the non-attack data, removing the character string from the candidate signature to obtain the second signature, and
- when the candidate signature does not include the character string used in the non-attack data, obtain the second candidate as the candidate signature.

6. The method of generating a signature according to claim 5, wherein
the character string used in the non-attack data is stored in a database, and
the generating includes performing matching between a character string included in the candidate signature and the character string stored in the database to evaluate whether the candidate signature includes the character string used in the non-attack data.

7. The method of generating a signature according to claim 5, wherein the extracting includes holding the attack data upon converting a data format thereof to a predetermined data format.

8. The method of generating a signature according to claim 5, further comprising:
a submitting step of submitting the second signature to a specific submission destination.

9. A non-transitory computer-readable medium storing a program that causes a computer to execute:
a collecting procedure of collecting threat information;
an extracting procedure of extracting attack data from the threat information collected in the collecting procedure; and
a generating procedure of generating a second signature on the basis of the attack data extracted in the extracting procedure, wherein
the generating procedure includes:
- when plural pieces of attack data having a common character string are extracted in the extracting procedure, generating a candidate signature including the common character string,
- evaluating, using a white list, whether the candidate signature includes a character string used in non-attack data, wherein the white list is a list of character strings that are used also in the non-attack data that is not the attack data, and
- when the candidate signature includes the character string from the white list used in the non-attack data, removing the character string from the candidate signature to obtain the second signature, and when the candidate signature does not include the character string used in the non-attack data, obtain the second signature as the candidate signature.

* * * * *